United States Patent [19]

Sulc et al.

[11] Patent Number: 4,890,911
[45] Date of Patent: Jan. 2, 1990

[54] CONTACT LENS AND THE METHOD OF MANUFACTURING THEREOF

[75] Inventors: Jiri Sulc; Zuzana Krcova, both of Prague, Czechoslovakia

[73] Assignee: Ceskoslovenska akademie ved, Prahal, Czechoslovakia

[21] Appl. No.: 217,414

[22] Filed: Jul. 11, 1988

[51] Int. Cl.$^4$ .................................................. G02C 7/04
[52] U.S. Cl. .................................. 351/160 H; 351/177
[58] Field of Search ............... 351/160 R, 160 H, 161, 351/162, 177

[56] References Cited

U.S. PATENT DOCUMENTS

| | | | |
|---|---|---|---|
| 3,489,491 | 1/1970 | Creighton | 351/160 H |
| 3,973,837 | 8/1976 | Page | 351/160 H |
| 3,973,838 | 8/1976 | Page | 351/160 H |
| 4,143,949 | 3/1979 | Chen | 351/160 H |

*Primary Examiner*—Scott J. Sugarman
*Attorney, Agent, or Firm*—Leydig, Voit & Mayer

[57] ABSTRACT

The invention pertains to a new design of contact lenses and to the method of their manufacturing. The contact lens comprising a carrier portion and a hydrophilic supporting portion mediating the contact of the lens with the eye surface, wherein both these parts are made from different materials, with the supporting portion being divided into two or more independent pieces protruding above the concave surface of the lens and lead from the lens circumference towards the lens center which is left free, with gaps being provided between individual pieces. The supporting part is made from a water-swelling synthetic crosslinked hydrogel which has, in the state of full swelling with physiological saline, a swelling capacity of about 40 to 95 percent, whereas the carrier optical portion is made from a transparent material having a modulus of elasticity at least twice that of the modulus of elasticity of the supporting portion. The supporting portion forms a gap of at least 0.01 mm between the eye surface and the uncovered part of the lens.

21 Claims, 2 Drawing Sheets

CONTACT LENS AND THE METHOD OF MANUFACTURING THEREOF

FIELD OF THE INVENTION

The invention pertains to a new design of contact lenses and a method for their manufacturing.

BACKGROUND OF THE INVENTION

There are substantially two types of contact lenses presently commercially available: hard lenses and soft lenses. The hard lenses are made of glass, poly(methyl methacrylate), crosslinked copolymers of methyl methacrylate with allyl methacrylate, polystyrene, polycarbonates, and the like. The soft lenses are most often comprised of hydrogels, but they may also be hydrophobic——being made of polysiloxane or of polymers and copolymers of butyl acrylate and methacrylate. The hydrophilic lenses are most often prepared from polymers of 2-hydroxyethyl methacrylate crosslinked with less than one percent of ethylene dimethacrylate or 3-oxypentamethylene dimethacrylate (i.e., ethylene glycol and diethylene glycol dimethacrylate). However, they may also be produced using polymers of 2,3,-dihydroxypropyl methacrylate (glycerol methacrylate) crosslinked with a small amount of hydroxypropanediol dimethacrylate or 1,2,3-propanetriol trimethacrylate (glycerol di- or trimethacrylate) or from copolymers of N-vinylpyrrolidone with lower esters of acrylic or methacrylic acid or from other transparent polymers and copolymers.

All these materials have their individual advantages and shortcomings. For example, the hard lenses made from poly(methyl methacrylate) do not conform to the shape of the eye, whereas the soft lenses do conform but do not allow tear circulation. The hard lenses are also impermeable to oxygen, in contrast to the soft lenses which let through oxygen albeit partially but have better permeability for low-molecular-weight metabolites. The lenses from polysiloxane rubber are permeable to gaseous oxygen however they do not allow the metabolites or bactericide lysozymes dissolved in tears to permeate. Upon subsequent study, it was determined that the direct permeation of oxygen through a contact lens is desirable although the amount of oxygen which permeated through the presently available lenses was not sufficient for proper nourishment of cornea. The use of highly swelling hydrogels to circumvent this problem was attempted, as the permeability of oxygen through this material approaches the oxygen permeability of pure water. However, it was discovered that the majority of oxygen is supplied to the cornea not by means of oxygen permeating through this material, but by tear liquid, the access of which is obstructed by soft hydrogel lenses due to their close fit on the surface of the cornea. Moreover, the more the lens is swollen with water, the lower is its refractive index, and consequently, the thicker it must be. This swelling which results in the favorable characteristic of high oxygen permeability unfortunately also has a negative aspect—it extends the diffusion path of the oxygen. The limited access of tears and thus also that of lysozymes is a very serious defect which allows the undisturbed growth of harmful microbes. It is for this reason that the long-term wearing of very soft and thus well physically tolerated contact lenses is not only undesirable, but very dangerous from a medical perspective. These lenses significantly increase the risk of ulcers on the cornea and thereby endangering a person's sight.

State-of-the-art contact lenses are presently constructed of synthetic hydrogels, in particular lightly crosslinked 2-hydroxyethyl methacrylate. These hydrogels have the least disadvantages but contain up to 40% water when completely swollen. In an attempt to increase the water content of the lenses, manufacturers are presently striving to increase the water content of the lenses to approach that which is contained in the body (about 70%). This, however, requires strongly swelling gels which must exhibit sufficient structural strength to maintain the precise shape of the lens and to resist tearing, e.g., from a damaged edge. Such properties are mutually exclusive in the aforementioned presently available materials. Moreover, the increased water content results in a decrease of the refractive index and necessarily in an increase in thickness, above all in aphakic lenses. Although lysozymes cannot penetrate through a strongly swollen gel because of their high molecular weight, such a gel has the drawback of making the access of tears to the cornea more difficult because the softer the gel is the more it adheres to the eye surface.

In view of the foregoing discussion, it is clear that various portions of a contact lens require so many different characteristics in order to ensure the lens' proper functioning that a single ideal material which would fully meet all of the requirements would seem to be non-existent. The optimal solution to the diverse demands of a contact lens which would allow long-term wearing consists of the application of at least two different materials. As the first hard contact lenses were made of glass or organic glass, it is not surprising that proposals have already been made to provide a glass or other type of hard lens with a softer edge or a continuous base, e.g., regenerated cellulose, rubber, and the like, in order to avoid wounding the eye with the thin glass edge lens and to reduce the irritation of the eye. See, for example, German (FRG) Pat. No. 921,416. However, this idea was not practiced as both materials are so different that they could not be permanently joined. Moreover, the design of lens was faulty, i.e. the lens rested tightly on the surface of cornea and thus prevented the access of oxygen both by diffusion and by the free streaming of tears onto the eye surface. It also prevented the access of lysozymes as the thin layer of swollen regenerated cellulose acted as an efficient seal. Moreover, regenerated cellulose in the swollen state is not softer than the surface of the cornea and it irritated the eye; this fact being mentioned by the inventor of the aforementioned patent.

Another attempt to remove the previously mentioned shortcomings was to provide a row of openings in the edge of a contact lens or in its center so that blinking causes the forced circulation of tear liquid due to the alternate pushing and drawing away of the lens (in particular, the soft lens) from the eye surface. However, the expected effect did not occur to a sufficient extent as the thin lens was too easily stuck to the eye and was therefore not able to effectively pump the tears in the space between the lens and cornea.

The present invention overcomes the shortcomings of the prior art lens with a unique lens design.

The features and advantages of the invention will be apparent upon reading the following description of preferred exemplified embodiments of the invention and upon reference to the accompanying drawings wherein:

Figure 1:
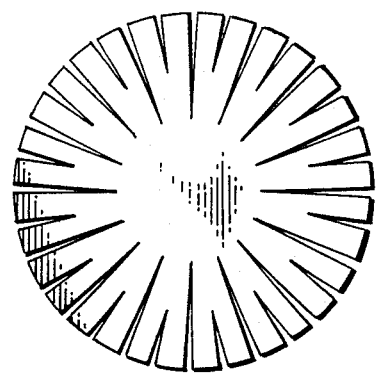
FIG. 1 shows a stencil used for forming the hydrophilic supporting portion of the lens.
Figure 2:
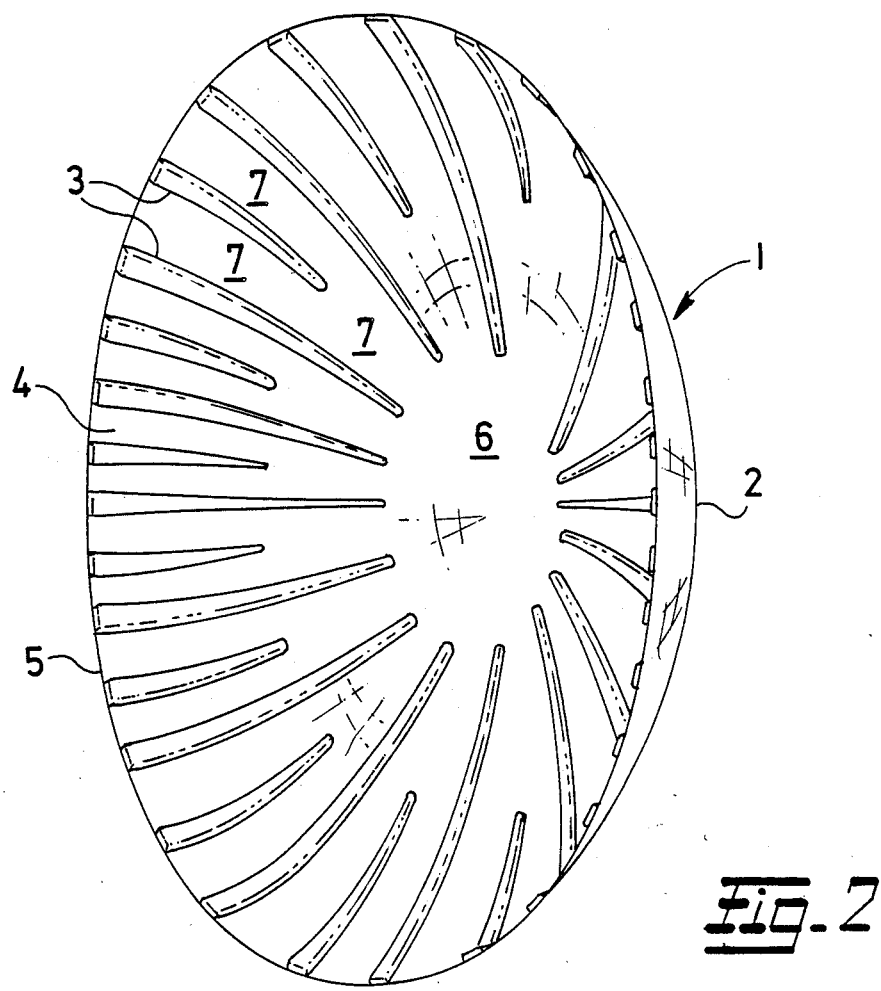
FIG. 2 is a view of the concave portion of the lens that is formed using the stencil shown in FIG. 1.
Figure 3:
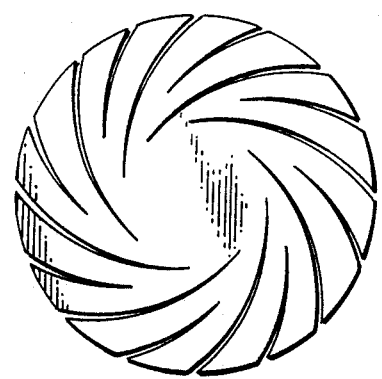
FIG. 3 depicts an alternative embodiment of the stencil.
Figure 4:
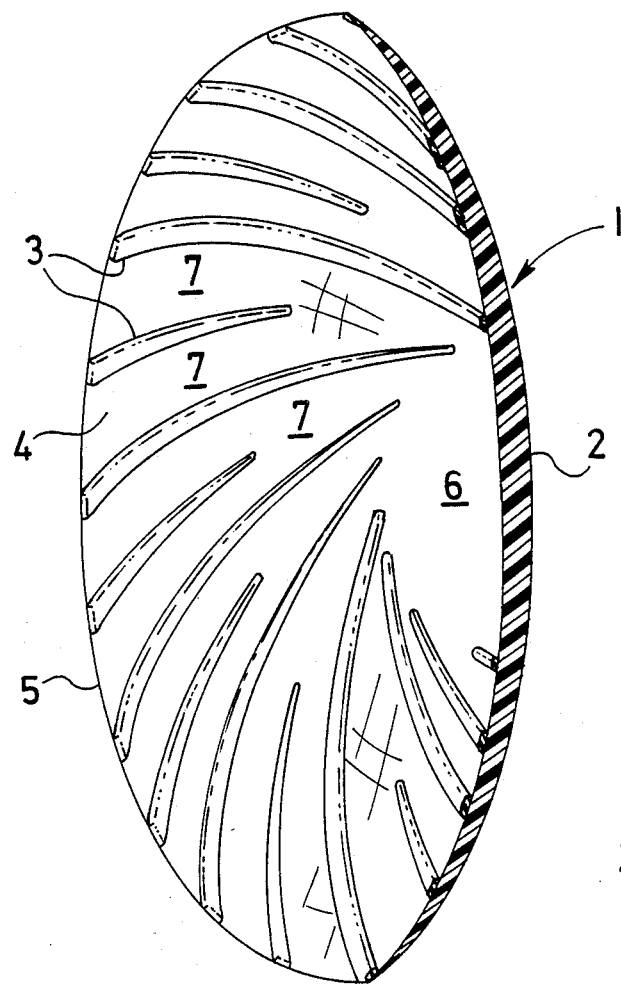
FIG. 4 shows a cross-sectional view of the lens formed using the stencil shown in FIG. 3.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The contact lens 1 of the present invention comprises a carrier optical portion 2 and a hydrophilic supporting portion 3 mediating the contact of lens 1 with the eye surface, both of these portions being made from different materials. The supporting portion 3 is divided into at least two independent pieces which protrude above the concave side 4 of the lens 1 and lead from the lens circumference 5 towards the lens center 6 which is left free, with gap 7 being left between the individual pieces of the supporting portion 3. This supporting portion is composed of a water-swelling synthetic crosslinked hydrogel which has, when fully swollen with physiological saline, a swelling capacity of 40 to 95%. The carrier optical portion of the lens is comprised of a transparent material, for example poly(HEMA) or poly(methyl methacrylate), having a modulus of elasticity at least twice as high as the modulus of elasticity of the supporting portion. The supporting portion should preferably form a gap of at least 0.01 mm between the eye surface and the uncovered carrier portion of lens.

The present invention has the lens designed in such a way that the longitudinal axes of the individual pieces of the supporting portion are coincidently deflected from the radius of lens (the individual parts of the supporting portion have a bow shape) whereas the angle of deflection is larger at the lens circumference than in the part directed towards the lens center.

A method for manufacturing the contact lenses according to the invention comprises the formation of protruding pieces of the supporting portion 3 on the concave side of lens by application of a crosslinkable solution of hydrophilic monomer or polymer. This hydrophilic monomer or polymer is then crosslinked, after evaporation of the solvent, and stored in physiological saline and sterilized. Examples of a suitable solvent include methanol and ethanol. The lens may be sterilized either by heating it to at least 100° C. or by chemical agents, such as ethylene oxide.

The solution of a crosslinkable monomer or polymer may be applied to the concave side of the lens by painting or spraying. Preferably a template or a stencil is used to ensure the correct application of the monomer or polymer. Another method is the application of a solution of a crosslinkable polymer by serigraphy on the lower side of lens.

An example of a hydrophilic crosslinkable polymer that may be used is a methanol- or ethanol-soluble copolymer of glycol monomethacrylate with glycol dimethacrylate, where the glycol is either a mono-, di- or triethylene glycol. The subsequent crosslinking step is carried out by the evaporation of the solvent and by reacting the remainder with a crosslinking agent at about 40 to 110° C. Another suitable crosslinkable polymer is the soluble copolymer of 2-hydroxyethyl methacrylate (HEMA) with ethylene glycol dimethacrylate which forms short side chains having a double bond. The preparation of such copolymers is described in U.S. Pat. No. 3,607,848 issued to Chromecek et al.

The permanent connection of both portions can be achieved in various ways, for example, by admixing monomeric HEMA with an initiator, e.g., 2,2-azo-bis-isobutyronitrile, into a solution of said polymer before application to the lens surface where the monomer also acts as a crosslinking agent. They may also be polymerized by irradiation.

Both HEMA and ethylene glycol dimethacrylate may be replaced in whole or in part by similar derivatives of 2,2-oxydiethanol (diethylene glycol) or 3,6-dioxaoctane-1,8-diol (triethylene glycol). Higher glycols are less suitable because of the excessive swelling and softness of the hydrogels prepared from their methacrylates or acrylates.

Of course, the above mentioned examples are not all inclusive. Any synthetic hydrogel which is suitable with respect to its physiological harmlessness can be used for the purpose of the invention. Examples of such hydrogels include a polymer of acrylaide or methacrylamide lightly crosslinked with an appropriate crosslinking agent, e.g., N,N-methylene-bis-methacrylamide, whereas said amides may be substituted on the nitrogen atom advantageously, with substituents containing one or two hydroxyl groups.

In addition to the above mentioned glycol monomethacrylate, suitable crosslinking agents may also comprise multifunctional compounds which react by condensation with the dissolved polymer, for example, anhydrides of dicarboxylic acids, such as succinic anhydride, or an appropriate aldehyde, such as formaldehyde, or dialdehyde. The crosslinking may also occur by heating with condensation catalysts, for example, with 4-toluenesulfonic acid, potassium hydrogensulfate, and others, or with acid condensation catalysts such as multivalent metalhalides, e.g., zinc dichloride.

A similar effect can be obtained by applying a mixture of suitable hydrophilic monomers with a crosslinking agent and polymerization initiator in the form of separated pieces on the concave side of the lens.

The carrier optical portion 2 of the lens 1 may also be made from a lightly crosslinked synthetic hydrogel. In this case, the carrier optical portion 2 of the lens 1 is made from a hydrophilic crosslinked gel and a solution of crosslinkable hydrophilic monomer r polymer. This is then applied on the lower side of the carrier portion. After this has at least partially dried, the monomer is polymerized either by means of an initiator added in advance, e.g., 2,2-azo-bis-isobutyronitrile, or by additional irradiation with rays, e.g., short-wave rays. Thus, it is preferable to first dry the carrier optical portion of the lens in a planarized state, i.e. after pressing it onto a planar surface such as a flat piece of glass.

The protruding supporting portion 3 of the lens may be formed on the lower side of the lens using organic material and chemical agents which act locally to increase the swelling of the organic material by about 40 to 95 percent. The agent which acts locally to increase the swelling of the organic material of the carrier optical portion 2 is selected from the group comprised of an at least 5% solution of alkaline hydroxide, an at least 10% solution of ammonium hydroxide, a solution of hydrogen chloride in an at least 50% aqueous solution of zinc dichloride with a pH of at least 1.5, an at least 50% nitric acid solution, an at least 70% sulfuric acid solution, an at least 96% phosphoric acid solution, or a mixture of mutually compatible agents of this group. The agent may also contain glycerol.

The difference in moduli of elasticity of the eye surface and hydrogel cannot be exactly measured at this time, but the existence of a lower modulus in the hydrogel is easily recognized from the fact that the swollen and wetted hydrogel does not irritate the surface of eye during movement of the lens. However, a criterion which can be precisely determined is the swelling capacity of the hydrogel in physiological saline. It is necessary for the supporting portion 3 to always be higher than 40% to ensure the perfect wetting and smoothness of the surface, thereby enabling the slipping of the lens on the eye.

In order to not reduce the joint strength of both portions due to different swelling, one or more interlayers from the similar materials may be provided between both main joined portions. For example, see U.S. Pat. No. 3,625,741.

The lens according to the invention acts in such a way that it enables and assists the motion of tear liquid along the whole surface of eye. Liquid flows through the gaps between individual pieces of the supporting portion 3. These pieces continuously change their position on the eye because the whole lens is continuously turned by a certain angle around its axis due to the motion of the eyelid. This effect occurs even during sleep, ensuring that no part of the eye surface will be permanently free from access by lysozymes thereby inhibiting the formation of a safe hiding place for microbes. The pumping effect of the present invention is substantially greater than that of lenses which fit directly on the eye—the gap between eye surface and the carrier optical portion of the lens preventing the lengthy sticking of the lens onto the eye after its temporary compression by the eyelid. In addition, the eye is not irritated as the surface of the supporting portion 3 which is in contact with cornea is softer than the surface of the cornea and is also sufficiently large. While the very soft swollen gel glides well on the eye surface, the friction coefficient may be further reduced if a very thin surface layer of the supporting portion 3 is transferred into a superhydrophilized gel by a known method. This may be accomplished, for example, by the short action of concentrated hydroxide solution with subsequent neutralization followed by washing, or by wetting with glycerol and contacting it with gaseous sulfur trioxide followed by neutralization, e.g., with gaseous ammonia, and washing. Both these methods form bound anions in the surface layer which are strongly hydrated. A similar effect may be also achieved by formation of the supporting layer by copolymerization of a suitable hydrophilic monomer, for example, HEMA, with acrylic or methacrylic acid, accompanied or followed by neutralization.

EXAMPLE 1

A contact lens of poly(2-hydroxyethyl methacrylate) crosslinked with 0.6% of ethylene dimethacrylate was pressed on its convex side onto a glass plate and allowed to dry in air for four hours in this flattened position. A solution obtained by the addition of 0.1% wt. succinic anhydride to a 10% wt. methanolic solution of the copolymer of 2-hydroxyethyl methacrylate with 2.4 mol. percent ethylene dimethacrylate, which was prepared according to U.S. Pat. No. 3,607,848, was then applied to the inner surface of the contact lens over a stencil having the shape depicted in FIG. 1. After drying by the evaporation of methanol, the lens was removed from the glass, heated to 105° C. for 30 minutes, and allowed to swell in water. It was then stored in a 0.8% solution of sodium chloride in distilled water and sterilized by boiling. The resulting lens can be worn for several days without irritation, fogging, or danger of infection of the eye. It can then be sterilized and reused.

EXAMPLE 2

A 40% ethanolic solution of a copolymer according to Example 1 was prepared, in which was mixed 2% wt. of anhydrous monomeric 2-hydroxyethyl methacrylate and 0.1% wt. of isopropyl peroxycarbonate at 0° C. This was applied on a hard lens of poly(methyl methacrylate) over a convex stencil inserted onto the concave side of lens. The entire assembly, including the lens, was placed in a vessel filled with pure nitrogen. After 40 minutes, the lens was dried in air at 50° C., stored in physiological saline, and sterilized by boiling.

EXAMPLE 3

A solution was prepared by dissolving 1% wt. of anhydrous zinc dichloride and 10% wt. of non-crosslinked copolymer of 5-hydroxy-3-oxapentyl methacrylate (diethylene glycol monomethacrylate) with 1.2 mol. percent of 3-oxapentamethylene dimethacrylate (diethylene glycol dimethacrylate) in anhydrous methanol. This solution was subsequently applied to the lens. After evaporation of the methanol, the lens was heated for 30 minutes to 65° C. and further processed as described in the preceding Examples.

EXAMPLE 4

Four pieces of the supporting portion were printed by serigraphy on a dried planarized contact lens produced from a lightly crosslinked poly(HEMA) with a 10% methanolic solution containing 6 parts of methacrylamide, 2 parts of methacrylic acid, 0.08 parts of N,N-methylene-bis-acrylamide and 0.02 parts of 2,2-azo-bis-isobutyronitrile. After the majority of ethanol had been evaporated, the lens was heated for 60 minutes to 65° C. under an inert gas, then thoroughly washed, first in ethanol and then in a diluted solution of sodium hydrogencarbonate and water, and eventually sterilized in physiological saline.

EXAMPLE 5

The pattern according to FIG. 1 was applied onto a dried lens produced from a lightly crosslinked poly(HEMA) by means of serigraphy using a 20% solution of glycerol in concentrated sulfuric acid, which was allowed to act for 60 secs at 130° C. The lens was then neutralized using a diluted solution of sodium hydrogencarbonate and thoroughly washed. The supporting portion formed by this process consisted of a 0.1 mm thick layer of strongly swelling gel having a very slippery surface.

EXAMPLE 6

The procedure according to Example 5 was repeated, except that the supporting portion of the lens was formed by the application of a 40% solution of sodium hydroxide. After 30 minutes the lens was neutralized with diluted acetic acid. A diluted solution of sodium hydrogencarbonate was subsequently applied in order to neutralize the carboxylic groups. The lens was then washed with water and stored in sterile physiological saline.

A great number of hydrophilic monomers exist which may be polymerized with simultaneous or additional crosslinking, and a specialist in this field should be consulted to choose a suitable combination. For example, bis-hydroxyethyl-methacrylamide, salt of methacrylic acid with triethanolamine, acrylamide and its N-substituted and N-disubstituted hydrophilic derivatives, N-vinylpyrrolidone and other N-vinyllactams, etc. may be utilized. Analogously, a number of crosslinking agents of both a diolefinic and condensation type is also known. All such mixtures which form lightly crosslinked hydrogels may be used in the formation of contact lenses according to this invention.

We claim:

1. A contact lens consisting of a carrier optical portion and a hydrophilic supporting portion which mediates the contact of the lens with an eye surface, wherein both portions are made from different materials; the supporting portion is divided into at least two independent pieces which protrude above the concave side of the lens and lead from the lens circumference towards the center of said lens which is left free, with gaps being left between individual pieces of the supporting portion; the supporting portion being made from a water-swelling synthetic crosslinked hydrogel which has, in the state of full swelling with physiological saline, a swelling capacity of about 40 to 95 percent; the carrier optical portion being made from a transparent material having a modulus of elasticity at least about twice that of the modulus of elasticity of the supporting portion; and the supporting portion forming a gap of at least 0.01 mm between the eye surface and the uncovered carrier portion of the lens.

2. A contact lens according to claim 1, wherein said carrier optical portion is preferably produced from poly-(HEMA) or poly (methyl methacrylate).

3. A contact lens according to claim 1, wherein the longitudinal axes of the individual pieces of said supporting portion are coincidently deflected from the radius of the lens.

4. A contact lens according to claim 2, wherein the individual pieces of said supporting portion have a bow shape, the angle of deflection being larger at the lens circumference than in the part directed towards center of the lens.

5. A process for the production of a contact lens having a carrier optical portion and a hydrophilic supporting portion comprising forming a carrier optical lens portion having a concave lower side and a concave exterior side, said carrier optical portion being made of a transparent material having a modulus of elasticity at least about twice that of the modulus of elasticity of the supporting portion, forming on the concave side of said carrier portion the hydrophilic supporting portion comprising at least two independent pieces, by applying to said concave side a cross-linkable solution of a hydrophilic monomer or polymer which, when crosslinked, forms a gel having, in the full state of swelling with physiological saline, a swelling capacity of about 40 to 90 percent, allowing the solvent to evaporate, crosslinking said monomer or polymer, resulting in a hydrophilic supporting portion which is comprised of a different material than the carrier optical portion, storing the resulting lens in physiological saline, and sterilizing the lens, the crosslinkable solution being applied to form protrusions above the concave side of the lens leading from the lens circumference towards, but not including, the center of said lens, each of said protrusions having gaps therebetween, the protrusions being permanently joined on one side thereof to the concave side of said carrier optical portion, the opposite side of said protrusions forming an eye surface designed for resting, in use, on the surface of an eye, the crosslinkable solution being applied in sufficient thickness to result in a gap of at least 0.01 mm between the eye surface and the interior concave surface of the carrier portion.

6. The process according to claim 5, wherein said solvent is preferably methanol or ethanol.

7. The process according to claim 5, wherein the solution of a crosslinkable hydrophilic monomer or polymer is applied on the concave side of a lens by painting or spraying.

8. The process according to claim 5, wherein the solution of a crosslinkable polymer is applied on the lower surface of the lens by serigraphy.

9. The process according to claim 5, wherein a copolymer of glycol methacrylate with glycol dimethacrylate soluble in methanol or ethanol is used as the hydrophilic crosslinkable polymer, where glycol is understood as a mono-, di-, or triethylene glycol.

10. The process according to claim 5, wherein the crosslinking is carried out by the evaporation of a solvent and reaction with a crosslinking agent at about 40 to 100° C.

11. The process according to claim 10., wherein the crosslinking agent is glycol monomethacrylate with initiatory liberating free radicals.

12. The process according to claim 11, wherein said crosslinking agent is preferably 2,2-azo-bisisobutyronitrile.

13. The process according to claim 10, wherein an anhydride of dicarboxylic acid is used as a crosslinking agent.

14. The process according to claim 10, wherein an acid condensation catalyst is used as a crosslinking agent.

15. The process according to claim 14, wherein said acid condensation catalyst is a multivalent metal halide.

16. The process according to claim 15, wherein said multivalent metal halide is preferably zinc dichloride.

17. The process according to claim 5, wherein the carrier optical portion of the lens is produced from a hydrophilic crosslinked gel, the solution of a crosslinkable hydrophilic monomer or polymer being applied on the lower surface of the carrier portion after it has been dried at least in part, and the monomer being polymerized either by means of an initiator added in advance or by the additional irradiation with rays, for example, short-wave rays.

18. The process according to claim 17, wherein said initiator is preferably 2,2-azo-bis-isobutyronitrile.

19. The process according to claim 5, wherein the pieces of the protruding supporting portion of the lens are formed on the lower surface of the lens by the action of chemical reagents which increase the local swelling capacity of the original material to about 40 to 95 percent.

20. The process according to claim 19, wherein said reagent is selected from the group consisting of an at least 5% solution of alkaline hydroxide, an at least 10% solution of ammonium hydroxide, a solution of hydrogen chloride in an at least 50% aqueous solution of zinc dichloride having a pH up to 1.5, an at least 70% solution of sulfuric acid, an at least 96% solution of phosphoric acid, and mixtures of mutually compatible agents from this group used as the reagent to locally increase the swelling capacity of the organic material of the carrier optical part.

21. The process according to claim 20, wherein said reagent contains glycerol.

* * * * *